No. 783,615. PATENTED FEB. 28, 1905.
J. M. CONROY.
CORNER CLAMP.
APPLICATION FILED JUNE 27, 1904.

WITNESSES:
Herbert Bradley
Fred Kirchner

INVENTOR
John M. Conroy
by Christy & Christy, Att'ys

No. 783,615. Patented February 28, 1905.

UNITED STATES PATENT OFFICE.

JOHN M. CONROY, OF ALLEGHENY, PENNSYLVANIA.

CORNER-CLAMP.

SPECIFICATION forming part of Letters Patent No. 783,615, dated February 28, 1905.

Application filed June 27, 1904. Serial No. 214,357.

*To all whom it may concern:*

Be it known that I, JOHN M. CONROY, a citizen of the United States, residing at Allegheny, in the county of Allegheny and State of Pennsylvania, have invented or discovered certain new and useful Improvements in Corner-Clamps, of which improvements the following is a specification.

The invention described herein relates to certain improvements in clamps for securing together plates of glass or other material arranged at an angle to each other; and the invention has for its object a construction in which two clamping members, one or both being resilient, are arranged to bear under tension on the respective plates, the points of bearing of the clamps being opposite each other on opposite sides of the plate, so that the latter will be subjected only to a direct pressure and not to any torsional strains.

The invention is hereinafter more fully described and claimed.

Figure 1:
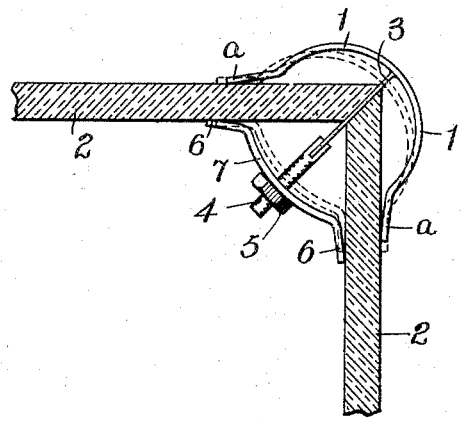
Figure 2:
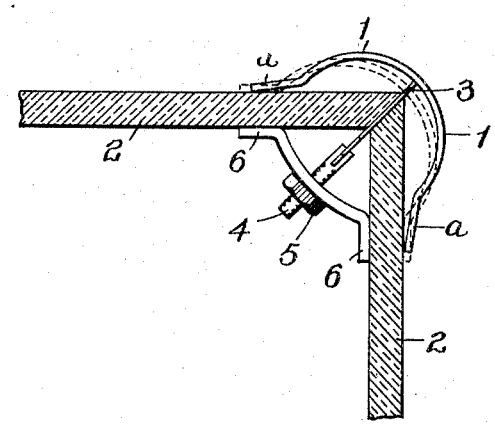
Figure 3:
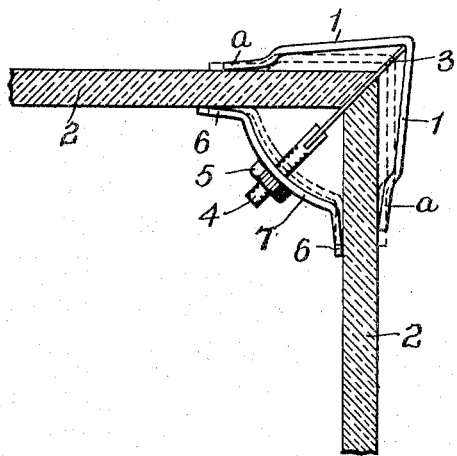
Figure 4:
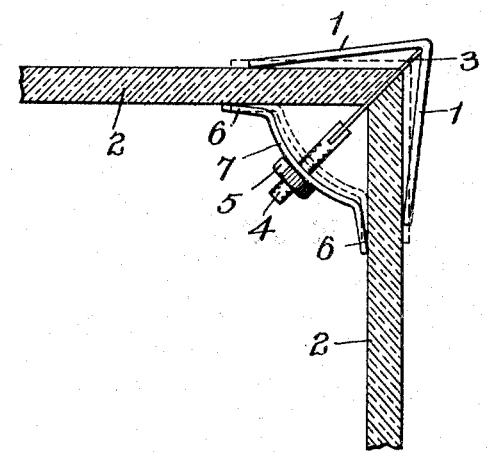

In the accompanying drawings, forming a part of this specification, Figure 1 is a view, partly in section and partly in elevation, of one form of my improved clamp applied to plates arranged at an angle to each other. Fig. 2 is a similar view showing a modification of the construction shown in Fig. 1. Figs. 3 and 4 are views similar to Fig. 1, illustrating further modifications of my improvement.

In the practice of my invention the outer clamping member is so constructed that its bearing-surfaces *a* will normally lie in planes forming with each other an angle less than the angle formed by the glass plates 2 when placed in the desired relation to each other, so that when this clamping member is applied to the glass it will not have any bearing on the glass before tension is exerted thereon except at or adjacent to its ends on the plates. These bearing portions or surfaces *a* are integral with the arms 1 of the clamping member. These arms are preferably made resilient, so that the bearing portions are yieldingly held against the plates. A tongue 3 is secured to the outer clamping member at a point intermediate of the ends of the arms 1, the bearing portions of the latter forming acute angles with the tongue or stem. This tongue or stem projects inwardly and is provided with a threaded portion 4 for the reception of a nut 5. The inner clamping member, through which the stem 3 passes, is provided with bearing portions 6, which when the clamping member is made resilient will normally lie in planes forming an angle with each other greater than the angle of the plates of glass 2. The bearing portions 6 are connected by a brace portion 7, which is preferably made concavo-convex or bowed as regards the portion intermediate of the ends.

In the construction shown in Figs. 1 and 2 the outer clamping member has its arms 1 curved or bowed and made continuous one with the other, while in the construction shown in Fig. 3 the arms of the outer clamping member are made straight; but the bearing portions are formed by bending in the ends of the arms, so that such clamping member will not bear upon the glass, except at its portions *a*. In my preferred construction the arms of the outer clamping member are made straight, as shown in Fig. 4, so as to bear when placed under proper tension for their whole length against the surfaces of the glass. The inner and outer clamping members are so constructed that their bearing portions will when such members are placed under tension or tightened up on the glass plates bear directly opposite each other, as shown by dotted lines in the several views. By reason of this construction the glass is not subjected to pressures out of line with each other, which would be liable to cause a breaking of the glass.

The draft stem or tongue 3 is made thin transversely, but of considerable width, so as to afford proper tensional strength, and by making it of sufficient width it can be reduced in thickness, so as to avoid the necessity of notching the adjacent edges of the plates for its reception. In practice the tongue would be made of a thickness equal to the desired thickness of cement placed between the meeting edges of the glass.

I claim herein as my invention—

1. An angle-clamp for plates having in combination two clamping members each having resilient bearing portions in planes at angles to each other, the angle formed by the bearing portions of one of the members varying from the angle formed by the plates to be clamped, and means for forcing the clamping members toward each other, substantially as set forth.

2. An angle-clamp for plates having in combination an outer clamping member having connected bearing portions at an angle to each other, an inner clamping member having connected bearing portions at an angle to each other, the connections between the bearing portions of one of the members constructed to yieldingly hold the bearing portions normally at an angle to each other differing from the desired angle between the plates to be connected and means for drawing the clamping members toward each other, substantially as set forth.

In testimony whereof I have hereunto set my hand.

JOHN M. CONROY.

Witnesses:
DARWIN S. WOLCOTT,
F. E. GAITHER.